US009474007B2

(12) United States Patent
Jung et al.

(10) Patent No.: US 9,474,007 B2
(45) Date of Patent: Oct. 18, 2016

(54) INTERESTED SERVICE-BASED CELL RESELECTION METHOD IN WIRELESS COMMUNICATION SYSTEM, AND APPARATUS FOR SUPPORTING SAME

(71) Applicant: LG ELECTRONICS INC., Seoul (KR)

(72) Inventors: Sunghoon Jung, Seoul (KR); Youngdae Lee, Seoul (KR); Seungjune Yi, Seoul (KR); Sungjun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/440,044

(22) PCT Filed: Nov. 4, 2013

(86) PCT No.: PCT/KR2013/009907
§ 371 (c)(1),
(2) Date: Apr. 30, 2015

(87) PCT Pub. No.: WO2014/069961
PCT Pub. Date: May 8, 2014

(65) Prior Publication Data
US 2015/0264618 A1    Sep. 17, 2015

Related U.S. Application Data

(60) Provisional application No. 61/722,146, filed on Nov. 3, 2012.

(51) Int. Cl.
*H04W 36/00* (2009.01)
*H04W 36/30* (2009.01)
(Continued)

(52) U.S. Cl.
CPC ............. *H04W 36/30* (2013.01); *H04W 36/14* (2013.01); *H04W 48/20* (2013.01)

(58) Field of Classification Search
CPC ... H04W 36/00; H04W 36/18; H04W 80/04; H04W 8/245
USPC .......................... 455/436, 437, 418; 370/331
See application file for complete search history.

(56) References Cited

U.S. PATENT DOCUMENTS

2010/0330982 A1* 12/2010 Ishii ..................... H04W 76/027
455/422.1
2011/0022714 A1*  1/2011 Nobukiyo ............ H04J 11/0093
709/226

(Continued)

FOREIGN PATENT DOCUMENTS

KR    10-2009-0130293      12/2009
KR    10-2010-0024990       3/2010

(Continued)

OTHER PUBLICATIONS

PCT International Application No. PCT/KR2013/009907, Written Opinion of the International Searching Authority dated Feb. 20, 2014, 1 page.

*Primary Examiner* — Danh Le
(74) *Attorney, Agent, or Firm* — Lee, Hong, Degerman, Kang & Waimey; Jonathan Kang; Richard Salfelder

(57) ABSTRACT

Provided is an interested service-based cell reselection method performed by a terminal in a wireless communication system. The method comprises checking that access to the current cell is blocked, determining whether the condition for receiving an interested service is satisfied, and selecting, if the condition for receiving an interested service is satisfied, the cell on the same frequency as the frequency of the current cell.

14 Claims, 11 Drawing Sheets

(51) Int. Cl.
*H04W 48/20* (2009.01)
*H04W 36/14* (2009.01)

(56) References Cited

U.S. PATENT DOCUMENTS

| | | | |
|---|---|---|---|
| 2011/0053566 A1 | 3/2011 | Nader | |
| 2011/0070888 A1* | 3/2011 | Iwamura | H04J 11/0093 455/435.3 |
| 2012/0024864 A1* | 2/2012 | Champ | A61B 19/029 220/523 |
| 2014/0086173 A1* | 3/2014 | Sadeghi | H04L 5/005 370/329 |

FOREIGN PATENT DOCUMENTS

| | | |
|---|---|---|
| KR | 10-2011-0025155 | 3/2011 |
| WO | 2012/134182 | 10/2012 |

* cited by examiner

INTERESTED SERVICE-BASED CELL RESELECTION METHOD IN WIRELESS COMMUNICATION SYSTEM, AND APPARATUS FOR SUPPORTING SAME

BACKGROUND OF THE INVENTION

1. Field of the Invention

The present invention relates to wireless communication, and more particularly, to a cell reselection method based on an interested service of a terminal in a wireless communication system.

2. Related Art

3GPP (3rd Generation Partnership Project) LTE (long term evolution) which is improvement of UMTS (Universal Mobile Telecommunications System) has been introduced as 3GPP release 8. The 3GPP LTE uses OFDMA (orthogonal frequency division multiple access) in a downlink, and uses SC-FDMA (Single Carrier-frequency division multiple access) in an uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

Due to mobility of a terminal as a mobile device, the quality of a service provided to a current terminal may deteriorate or a cell that may provide a better service can be sensed. Therefore, the terminal may move to a new cell and such an operation is referred to as movement execution of the terminal. The terminal may select a cell on the same frequency, a cell on a different frequency, or a different radio access technology (RAT) cell through cell selection and/or cell reselection and move to the corresponding cell.

While the terminal camps on a specific cell, the terminal accesses the corresponding cell and in this case, a network may be limited thereto and this is referred to as access restriction. The terminal may perform a connection establishment procedure with the specific cell based on information associated with the access restriction by the network.

By the access restriction, the terminal may be restricted to an access to a specific frequency of the terminal. In this case, a problem may occur, in which an interested service of the terminal provided at the corresponding frequency may not be provided to the terminal, which may degrade efficiency of providing the service to the terminal. Accordingly, a cell reselection method needs to be proposed, which allows the terminal to receive the interested service by handling the access restriction with the interested service of the terminal.

SUMMARY OF THE INVENTION

The present invention has been made in an effort to provide a method for performing cell reselection based on an interested service of a terminal in a wireless communication system and an apparatus for supporting the same.

In an aspect, an interested service-based cell reselection method performed by a terminal is provided. The method comprises checking that accessing a current cell is barred, determining whether an interested service receiving condition is satisfied and selecting a cell at a frequency which is the same as a frequency as the current cell when the interested service receiving condition is satisfied.

The determining of whether the interested service receiving condition is satisfied may include determining that the interested service receiving condition is satisfied when the interested service of the terminal is provided from the current cell.

The determining of whether the interested service receiving condition is satisfied may include determining that the interested service receiving condition is satisfied when the interested service of the terminal is provided from the current cell and application of a lowest priority to the frequency of the current cell is not configured.

The determining of whether the interested service receiving condition is satisfied may include determining that the interested service receiving condition is satisfied when the interested service of the terminal is provided from the current cell and a priority lower than other frequency is applied to the frequency of the current cell.

The method may further comprise receiving system information from the current cell. The system information may include intra-frequency cell reselection information indicating whether the terminal is allowed to perform intra-frequency cell reselection when it is sensed that the current cell is barred.

When the interested service receiving condition is satisfied, selecting the cell at the frequency which is the same as the frequency of the current cell may be performed regardless of the intra-frequency cell reselection information.

The method may further comprise reselecting the cell based on the intra-frequency cell reselection information when the interested service receiving condition is not satisfied.

The selecting of the cell based on the intra-frequency cell reselection information may include selecting the cell that operates at the frequency of the current cell when the intra-frequency cell reselection information indicates that intra-frequency cell reselection is performed, and selecting the cell that operates at the frequency different from the frequency of the current cell when the intra-frequency cell reselection information indicates that intra-frequency cell reselection is not performed.

The checking that the access to the current cell is barred may include receiving cell status information indicating that the current cell is in a barred status, and the cell status information is included in system information broadcasted from the current cell.

The checking that the access to the current cell is barred may be performed based on access class barring information included in the system information broadcasted from the current cell.

The frequency of the current cell may be a serving frequency of the terminal.

In another aspect, a wireless device that operates in a wireless communication system is provided. The wireless device comprises a radio frequency (RF) unit which transmits or receives a radio signal and a processor which operates in a functional association with the RF unit. The processor is configured to check that accessing a current cell is barred, determine whether an interested service receiving condition is satisfied, and select cell at a frequency which is the same as a frequency as the current cell when the interested service receiving condition is satisfied.

According to an interested service-based cell reselection method of an exemplary embodiment of the present invention, even when a current cell is interrupted and it is indicated that intra-frequency cell reselection is not allowed by network signaling, a terminal can select or reselect which operates at a frequency which is the same as a current frequency. Therefore, a terminal can continuously receive an interested service provided at the current frequency.

Further, whether a network is congested with respect to a serving frequency can be reflected on an operation of the terminal that performs cell selection/reselection regardless of intra-frequency cell reselection information. That is, when the network is congested, the terminal may be implemented to perform cell selection/reselection according to the intra-frequency cell reselection information. Accordingly, when extreme congestion occurs at the current frequency, the intra-frequency cell selection/reselection can be avoided, and as a result, optimization of a network operation can be maintained.

DESCRIPTION OF EXEMPLARY EMBODIMENTS

Figure 1:
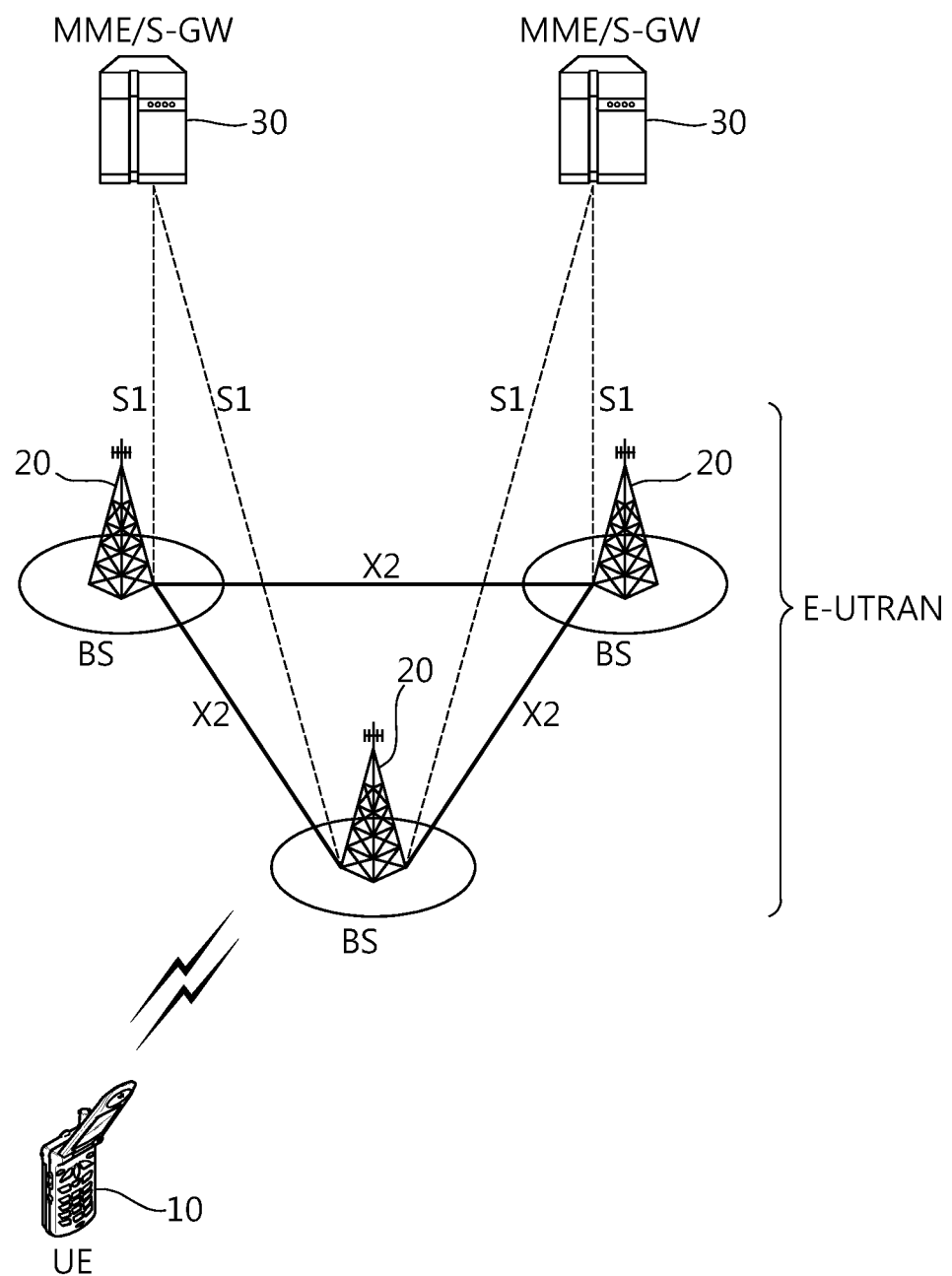
FIG. 1 illustrates a wireless communication system to which the present invention is applied.

FIG. 1 illustrates a wireless communication system to which the present invention is applied. The wireless communication system may be called an evolved-UMTS terrestrial radio access network (E-UTRAN), or a long term evolution (LTE)/LTE-A system.

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), a subscriber station (SS), a mobile terminal (MT), and a wireless device. The BS 20 generally represents a fixed station that communicates with the UE 10 and may be referred to as other terms such as an evolved-NodeB (eNB), a base transceiver system (BTS), and an access point.

The BSs 20 may be connected to each other through an X2 interface. The BS 20 is connected with an evolved packet core (EPC) 30 through an S1 interface, and more particularly, connected with a mobility management entity (MME) through an S1-MME and a serving gateway (S-GW) through an S1-U.

The EPC 30 is constituted by the MME, the S-GW, and a packet data network-gateway (P-GW). The MME has access information of the UE or information regarding capacity of the UE, and the information is frequently used in mobility management of the UE. The S-GW is a gateway having the E-UTRAN as an end point, and the P-GW is a gateway having the PDN as an end point.

Layers of a radio interface protocol between the UE and the network may be divided into a first layer L1, a second layer L2, and a third layer L3 based on three lower layers of an open system interconnection (OSI) standard model which is widely known in the communication system, and among them, a physical layer to which the first layer belongs provides an information transfer service using a physical channel, and a radio resource control (RRC) layer positioned on the third layer serves to control a radio resource between the UE and the network. To this end, the RRC layer exchanges an RRC message between the UE and the network.

Figure 2:
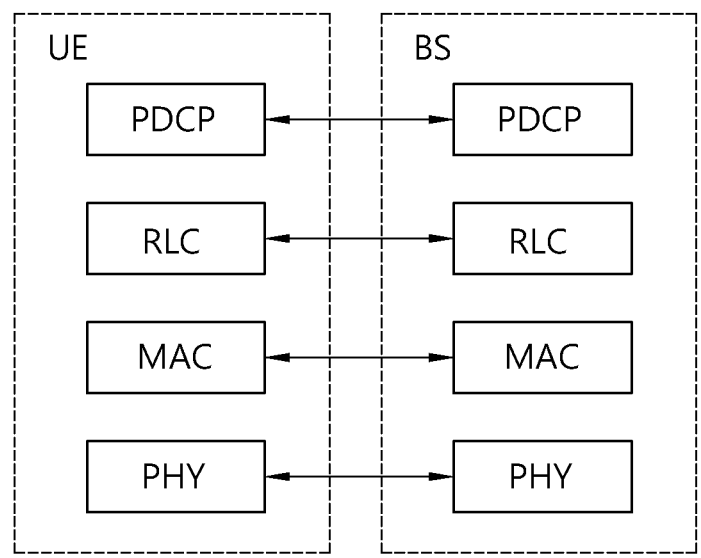
FIG. 2 is a block diagram illustrating a radio protocol architecture for a user plane.
Figure 3:
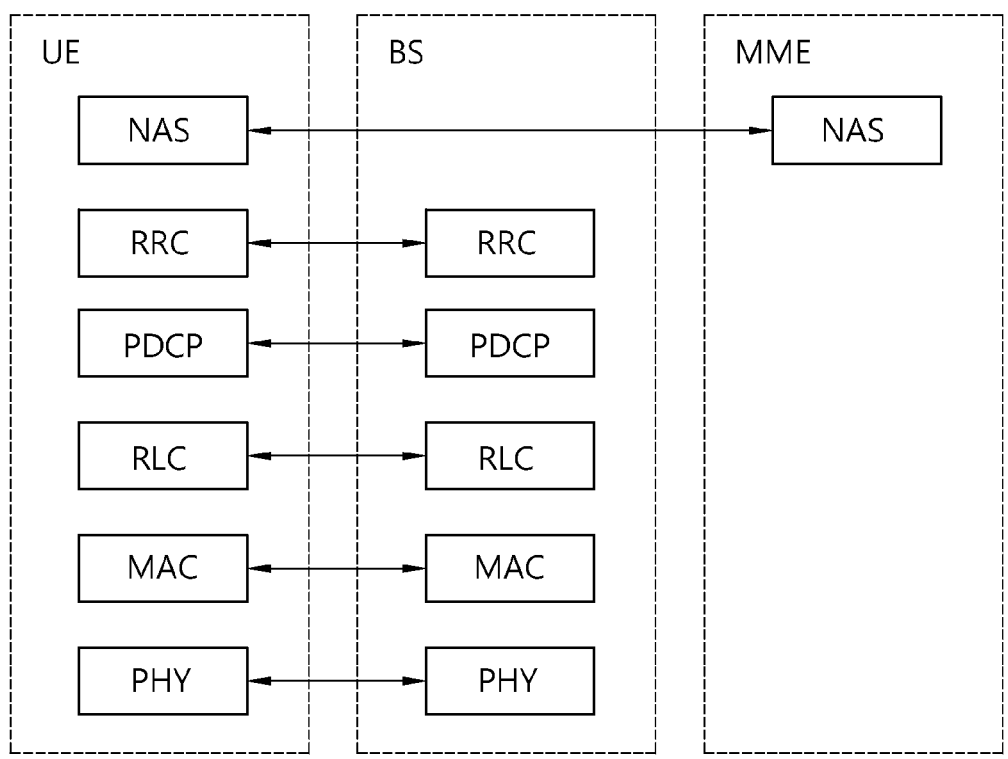
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for user data transmission, and the control plane is a protocol stack for control signal transmission.

Referring to FIGS. 2 and 3, a physical (PHY) layer provides an information transfer service to an upper layer by using a physical channel. The PHY layer is connected with a medium access control (MAC) layer which is the upper layer through a transport channel. Data move between the MAC layer and the PHY layer through the transport channel. The transport channel is classified according to how the data is transmitted through a radio interface with any characteristic.

The data move between different PHY layers, that is, the PHY layers of the transmitter and the receiver through the physical channel. The physical channel may be modulated by an orthogonal frequency division multiplexing (OFDM) scheme, and use a time and a frequency as the radio resource.

A function of the MAC layer includes mapping between a logical channel and a transport channel and multiplexing/demultiplexing to a transport block provided to the physical channel on the transport channel of a MAC service data unit (SDU) which belongs to the logical channel. The MAC layer provides a service to a radio link control (RLC) layer through the logical channel.

A function of the RLC layer includes concatenation, segmentation, and reassembly of the RLC SDU. In order to secure various quality of services (QoS) required by a radio bearer (RB), an RLC layer provides three operation modes of a transparent mode (TM), an unacknowledged mode (UM), and an acknowledged mode (AM). The AM RLC provides an error correction through an automatic repeat request (ARQ).

The radio resource control (RRC) layer is defined only in the control plane. The RRC layer is related with configuration, re-configuration, and release of the RBs to serve to control the logical channel, the transport channel, and the physical channels. The RB means a logic path provided by a first layer (PHY layer) and a second layer (MAC layer, RLC layer, or PDCP layer) in order to transfer the data between the UE and the network.

A function of a packet data convergence protocol (PDCP) layer in the user plane includes transfer, header compression, and ciphering of the user data. A function of the PDCP layer in the control plane includes transfer and ciphering/integrity protection of control plane data.

The configuration of the RB means a process of defining characteristics of the radio protocol layer and the channel in order to provide a specific service and configuring each detailed parameter and operation method. The RB may be divided into a signaling RB (SRB) and a data RB (DRB) again. The SRB is used as a path for transmitting an RRC message in the control plane, and the DRB is used as a path for transporting user data in the user plane.

When RRC connection is established between the RRC layer of the UE and the RRC layer of the E-UTRAN, the UE is in an RRC connected state, and if not, the UE is in an RRC idle state.

A downlink transport channel for transporting the data to the UE from the network includes a broadcast channel (BCH) for transporting system information and a downlink shared channel (SCH) for transporting user traffic or a control message. The traffic or the control message of a downlink multicast or broadcast service may be transported through the downlink SCH, or may be transported through a separate downlink multicast channel (MCH). Meanwhile, an uplink transport channel for transporting the data from the UE to the network includes a random access channel (RACH) for transporting an initial control message and an uplink shared channel (SCH) for transporting the user traffic or the control message in addition to the RACH.

A logical channel which is above the transport channel and mapped in the transport channel includes a broadcast control channel (BCCH), a paging control channel (PCCH), a common control channel (CCCH), a multicast control channel (MCCH), a multicast traffic channel (MTCH), and the like.

The physical channel is constituted by several OFDM symbols in a time domain and several sub-carriers in a frequency domain. One sub-frame is constituted by a plurality of OFDM symbols in the time domain. The RB as a resource allocation unit is constituted by a plurality of OFDM symbols and a plurality of sub-carriers. Further, each sub-frame may use specific sub-carriers of specific OFDM symbols (for example, first OFDM symbols) of the corresponding sub-frame for the physical downlink control channel (PDCCH), that is, a L1/L2 control channel. A transmission time interval (TTI) is a unit time of sub-frame transmission.

Hereinafter, an RRC state of the UE and an RRC connection method will be described.

The RRC state means whether the RRC layer of the UE is logical-connected with the RRC layer of the E-UTRAN or not, and a case where the RRC layer of the UE is connected with the RRC layer of the E-UTRAN is called a RRC connection state, and a case where the RRC layer of the UE is not connected with the RRC layer of the E-UTRAN is called an RRC idle state. Since the RRC connection exists in the UE in the RRC connection state, the E-UTRAN may determine the existence of the corresponding UE in a cell unit, and as a result, the UE may be efficiently controlled. On the other hand, the UE in the RRC idle state may not be determined by the E-UTRAN, and a core network (CN) is managed by a tracking area unit which is a larger area unit than the cell. That is, in the UE in the RRC idle state, only the existence is determined by a large area unit, and the UE needs to move in the RRC connection state in order to receive a general mobile communication service such as voice or data.

When the user first turns on the power of the UE, the UE first searches a proper cell and then stays in the RRC idle state in the corresponding cell. The UE in the RRC idle state establishes the RRC connection with the E-UTRAN through an RRC connection procedure only when the RRC connection is required, and is transited into the RRC connection state. There are several cases where the UE in the RRC idle state requires the RRC connection, and for example, uplink data transmission is required due to reasons such as user's call attempt, or a response message to a case where a paging message is received from the E-UTRAN is transmitted.

A non-access stratum (NAS) layer positioned above the RRC layer performs functions such as a session management and a mobility management.

In the NAS layer, in order to manage mobility of the UE, two states of EDEPS mobility management-REGISTERED (EMM-REGISTER) and EMM-DEREGISTERED are defined, and the two states are applied to the UE and the MME. The initial UE is in the EMM-DEREGISTERED state, and the UE performs a procedure of registering the UE in the corresponding network through an initial attaching procedure so as to be connected to the network. When the attaching procedure is successfully performed, the UE and the MME are in the EMM-REGISTERED state.

In order to manage signaling connection between the UE and the EPS, two states of an EPS connection management (ECM)-IDLE state and an ECM-CONNECTED state, and the two states are applied to the UE and the MME. When the UE in the ECM-IDLE state is RRC-connected with the E-UTRAN, the corresponding UE becomes in the ECM-CONNECTED state. When the MME in the ECM-IDLE state is S1-connected with the E-UTRAN, the corresponding MME becomes in the ECM-CONNECTED state. When the UE is in the ECM-IDLE state, the E-UTRAN does not have context information of the UE. Accordingly, the UE in the ECM-IDLE state performs a procedure related with the mobility based on the UE such as cell selection or cell reselection without receiving a command of the network. On the contrary, when the UE is in the ECM-CONNECTED state, the mobility of the UE is managed by the command of the network. When a position of the UE in the ECM-IDLE state is different from a position which is known to the network, the UE notifies the corresponding position of the UE to the network through a tracking area updating procedure.

Next, the system information will be described.

The system information includes necessary information which the UE needs to known so as to be connected to the BS. Accordingly, the UE needs to receive all the system information before being connected to the BS, and further, needs to have latest system information at all times. In addition, since the system information is information to be known by all the UE in one cell, the BS periodically transmits the system information. System information is divided into a master information block (MIB) and a plurality of system information blocks (SIB).

The MIB may include a limited number of parameters required to be obtained for other information from a cell, which are most requisite and are most frequently transmitted. User equipment first finds the MIB after downlink synchronization. The MIB may include information including a downlink channel bandwidth, a PHICH configuration, an SFN that supports synchronization and operates as a timing reference, and an eNB transmission antenna configuration. The MIB may be broadcast-transmitted through a BCH.

System information block type 1 (SIB1) among the included SIBs is transmitted while being included in a message of "SystemInformationBlockType1" and SIBs other than the SIB1 is transmitted while being included in a system information message. Mapping the SIBs to the system information message may be flexibly configured by scheduling information list parameters included in the SIB1. However, each SIB may be included in a single system information message and only SIBs having the same scheduling requirement value (e.g., cycle) may be mapped to the same system information message. Further, system information block type 2 (SIB2) is continuously mapped to a system information message corresponding to a first entry in a system information message list of a scheduling information list. A plurality of system information messages may be transmitted within the same cycle. The SIB1 and all information system information messages are transmitted through a DL-SCH.

In addition to the broadcast transmission, in the E-UTRAN, the SIB1 may be dedicatedly signaled while including a parameter similarly to a value set in the related art and in this case, the SIB1 may be transmitted while being included in an RRC connection reconfiguration message.

The SIB1 includes information associated with a user cell access and defines scheduling of other SIBs. The SIB1 may include PLMN identifiers of the network, a tracking area code (TAC) and a cell ID, a cell barring status indicating whether the cell is a cell which may camp on, a lowest receiving level required in the cell, which is used as a cell reselection reference, and information associated with transmission time and cycle of other SIBs.

The SIB2 may include radio resource configuration information common to all terminals. The SIB2 may include information associated with an uplink carrier frequency and an uplink channel bandwidth, an RACH configuration, a paging configuration, an uplink power control configuration, a sounding reference signal configuration, and a PUCCH configuration and a PUSCH configuration supporting ACK/NACK transmission.

The terminal may apply acquisition and change sensing procedures of the system information only to a PCell. In an SCell, the E-UTRAN may provide all system information associated with an RRC connection status operation through dedicated signaling when the corresponding SCell is added. When the system information associated with the configured SCell is changed, the E-UTRAN may release and add the considered SCell later and the release and addition may be performed together with the single RRC connection reconfiguration message. The E-UTRAN may configure parameter values other than a value broadcasted in the considered SCell through the dedicated signaling.

The terminal needs to guarantee validity of specific type system information and the system information is referred to as required system information. The required system information may be defined as follows.

In the case where the terminal is in an RRC idle status: It needs to be guaranteed that the terminal has valid versions of the MIB and the SIB1 as well as the SIB2 to SIB8 and this may be followed by supporting a considered RAT.

In the case where the terminal is in an RRC connection status: It needs to be guaranteed that the terminal has the valid versions of the MIB, the SIB1, and the SIB2.

In general, the validity of the system information may be guaranteed within a maximum of 3 hours after the system information is acquired.

Generally, services provided to the UE by the network may be divided into three types to be described below. Further, the UE differently recognizes the cell type according to which service may be provided. First, the services types will be described below, and then the cell types will be described.

1) Limited service: The service provides an emergency call and an earthquake and tsunami warning system (ETWS), and may be provided in an acceptable cell.

2) Normal service: The service means a public use of a general use, and may be provided in a suitable or normal cell.

3) Operator service: The service means a service for a communication network operator, and the cell may be used by only the communication network operator and may not be used by a general user.

In relation to the service type provided by the cell, the cell types may be divided below.

1) Acceptable cell: A cell in which the UE may receive the limited service. The cell is a cell which is not barred and satisfies a cell selection reference of the UE in the corresponding UE.

2) Suitable cell: A cell in which the UE may receive the normal service. The cell satisfies a condition of the acceptable cell and simultaneously satisfies additional conditions. As the additional conditions, the cell needs to belong to a public land mobile network (PLMN) to which the corresponding UE may be connected and be a cell in which the performance of the tracking area updating procedure of the UE is not barred. When the corresponding cell is a CSG cell, the UE needs to be a cell to be connected to the corresponding cell as the CSG member.

3) Barred cell: The cell is a cell which broadcasts information on a cell barred through the system information.

4) Reserved cell: The cell is a cell which broadcasts information on a cell reserved through the system information.

Figure 4:
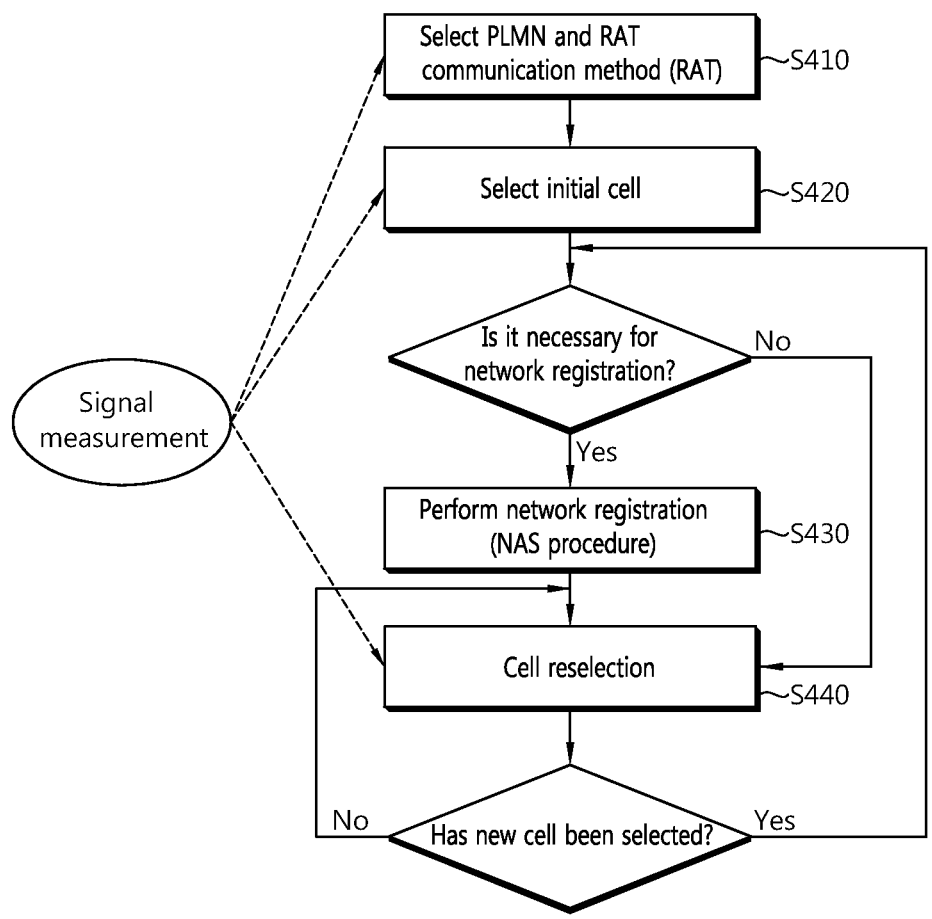
FIG. 4 is a flowchart illustrating an operation of the UE in the RRC idle state.

FIG. 4 is a flowchart illustrating an operation of the UE in the RRC idle state. FIG. 4 illustrates a procedure of registering a UE in which initial power is turned on in the network through a cell selection process and reselecting the cell if necessary.

Referring to FIG. 4, the UE selects a radio access technology (RAT) for communicating with the PLMN which is a network to receive the service (S410). Information on the PLMN and the RAT may be selected by the user of the UE, and stored in a universal subscriber identity module (USIM) to be used.

The UE selects the measuring BS and a cell having largest value among cells in which signal intensities and quality measured from the BS are larger than a predetermined value (Cell Selection) (S420). This is performing the cell selection by the turned-on UE and may be called initial cell selection. The cell selection procedure will be described below. After the cell selection, the UE receives system information which the BS periodically transmits. The aforementioned predetermined value means a value defined in the system for ensuring the quality for the physical signal in the data transmission/reception. Accordingly, the value may vary according to the applied RAT.

The UE performs a network registering procedure in the case where network registering is required (S430). The UE registers self-information (e.g., IMSI) in order to receive a service (e.g., paging) from the network. The UE needs not to be registered in the connected network whenever selecting the cell, but is registered in the network in the case where information (e.g., tracking area identity (TAI)) on the network received from the system information and information on a network which is known to the UE.

The UE performs cell reselection based on a service environment, a UE environment, or the like which is provide by the cell (S440). The UE selects one of other cells providing a better signal characteristic than the cell of the BS to which the UE is connected, when the value of the intensity or the quality of the signal measured from the BS receiving the service is a value measured from the BS of the neighbor cell. This process is distinguished from the initial cell selection of the second process to be called cell re-selection. In this case, in order to prevent the cell from being frequently reselected depending on the change in signal characteristic, there is a temporal constraint. The cell re-selection procedure will be described below.

Figure 5:
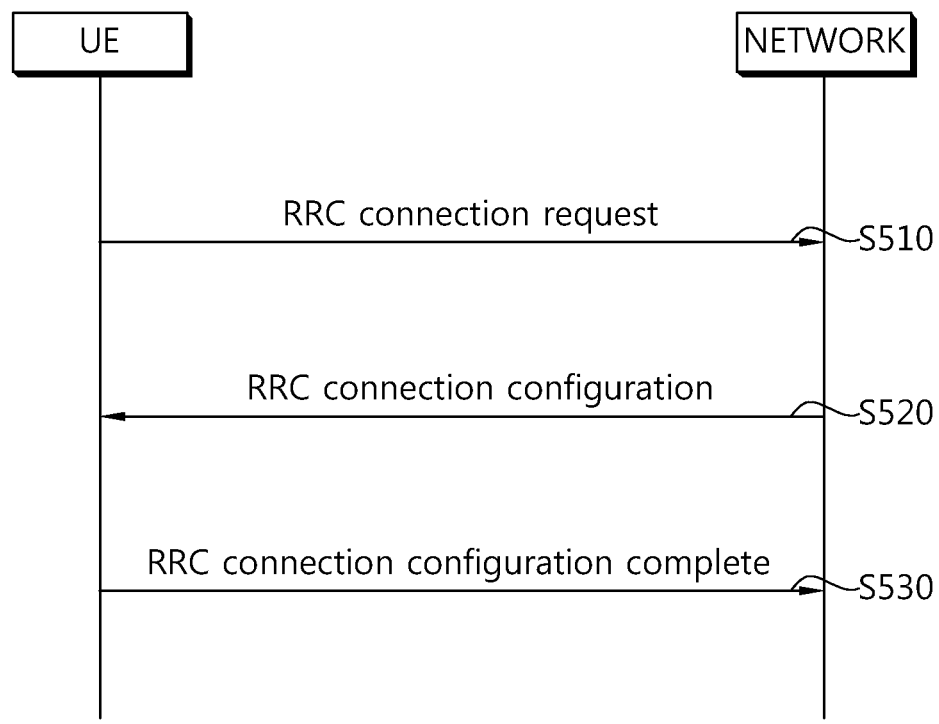
FIG. 5 is a flowchart illustrating a process of establishing RRC connection.

FIG. 5 is a flowchart illustrating a process of establishing RRC connection.

The UE transports an RRC connection request message requesting the RRC connection to the network (S510). The network transports an RRC connection setup message in a response for the RRC connection request (S520). After receiving the RRC connection setup message, the UE enters an RRC connection mode.

The UE transports to the network an RRC connection setup complete message used for verifying successful completion of the RRC connection establishment (S530).

Figure 6:
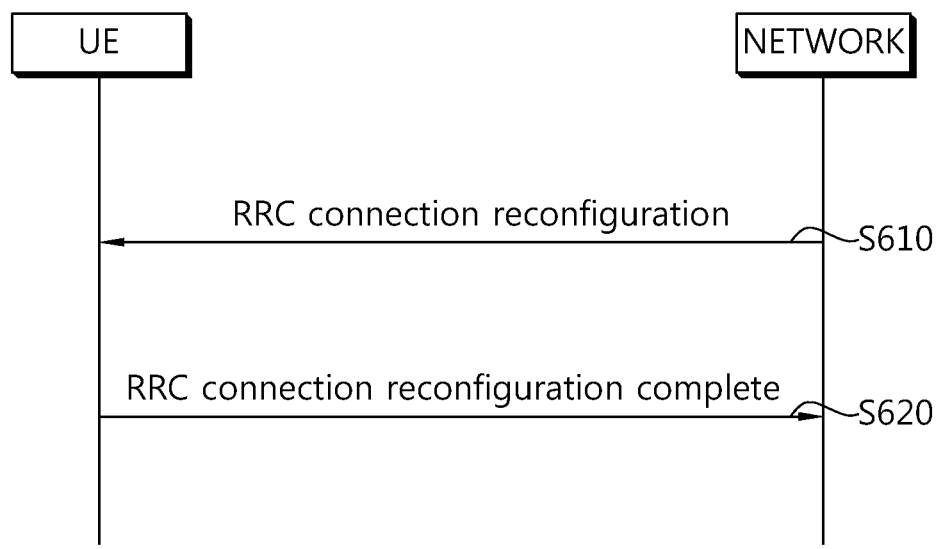
FIG. 6 is a flowchart illustrating an RRC connection reconfiguration process.

FIG. 6 is a flowchart illustrating an RRC connection reconfiguration process. The RRC connection reconfiguration is used for modifying the RRC connection. The RRC connection reconfiguration is used for RB establishment/modify/release, handover performance, and measurement setup/modify/release.

The network transports to the UE an RRC connection reconfiguration message for modifying the RRC connection (S610). The UE transports to the network an RRC connection reconfiguration complete message used for verifying successful completion of the RRC connection reconfiguration, as a response to the RRC connection reconfiguration (S620).

Hereinafter, the PLMN will be described.

The PLMN is a network which is arranged and operated by a mobile network operator. Each mobile network operator operates one or more PLMNs. Each PLMN may be identified as a mobile country code (MCC) and a mobile network code (MNC). PLMN information of the cell is included in the system information to be broadcasted.

In PLMN selection, cell selection, and cell re-selection, various types of PLMNs may be considered by the UE.

Home PLMN (HPLMN): PLMN having a MCC and a MNC matched with the MCC and the MNC of the UE IMSI.

Equivalent HPLMN (EHPLMN): PLMN handled to be equivalent to the HPLMN.

Registered PLMN (RPLMN): PLMN in which position registration is successfully completed.

Equivalent PLMN (EPLMN): PLMN handled to be equivalent to the RPLMN.

Each mobile service consumer is subscribed in the HPLMN. When a general service is provided to the UE by the HPLMN or the EHPLMN, the UE is not in a roaming state. On the other hand, when the service is provided to the UE by a PLMN other than the HPLMN/EHPLMN, the UE is in the roaming state, and the PLMN is called a visited PLMN (VPLMN).

The UE searches a usable PLMN and selects a suitable PLMN which may receive the service when the power is turned on in an initial stage. The PLMN is a network which is deployed or operated by a mobile network operator. Each mobile network operator operates one or more PLMNs. Each PLMN may be identified by a mobile country code (MCC) and a mobile network code (MNC). PLMN information of the cell is included in the system information to be broadcasted. The UE attempts to register the selected PLMN. When the registration is completed, the selected PLMN becomes a registered PLMN (RPLMN). The network may signal a PLMN list to the UE, and PLMNs included in the PLMN list may be considered as the PLMN such as the RPLMN. The UE registered in the network needs to be reachable by the network at all times. If the UE is in the ECM-CONNECTED state (equally, the RRC connection state), the network recognizes that the UE receives the service. However, when the UE is in the ECM-IDLE state (equally, the RRC idle state), the situation of the UE is not valid in the eNB, but stored in the MME. In this case, the position of the UE is in the ECM-IDLE state is notified to only the MME with granularity of the list of the tracking areas (TAs). A single TA is identified by a tracking area identity (TAI) constituted by a PLMN identity to which the TA belongs and a tracking area code (TAC) uniquely expressing the TA in the PLMN.

Next, among the cells provided by the selected PLMN, the UE selects a cell having signal quality and characteristic which may receive a suitable service.

Next, a procedure of selecting the cell by the UE will be described in detail.

When the power is turned on or the UE stays in the cell, the UE performs procedures for receiving the service by selecting/re-selecting a cell having proper quality.

The UE in the RRC idle state selects the cell having the proper quality at all times and needs to be prepared to receive the service through the selected cell. For example, the UE in which the power is just turned on needs to select the cell having the proper quality for registration to the network. When the UE in the RRC connection state enters the RRC idle state, the UE needs to select the cell staying in the RRC idle state. As such, a process of selecting the cell which satisfies any condition so that the UE stays in a service stand-by state such as the RRC idle state is called cell selection. Since the cell selection is performed in a state where the cell in which the UE stays in the RRC idle state is not currently determined, it is more important to select the cell as quickly as possible. Accordingly, so long as the cell is a cell providing radio signal quality of a predetermined level or more, even though the cell is not the cell providing the best signal quality to the UE, the cell may be selected in the cell selection process of the UE.

Hereinafter, with reference to 3GPP TS 36.304 V8.5.0 (2009-03) "User Equipment (UE) procedures in idle mode (Release 8)", a method and a procedure of selecting the cell by the UE in 3GPP LTE will be described in detail.

The cell selection process is largely divided to two processes.

First, as an initial cell selection process, the UE has no previous information on the radio channel in this process. Accordingly, the UE searches all radio channels in order to find a suitable cell. The UE finds the strongest cell in each channel. Thereafter, when the UE just finds the suitable cell stratifying a cell selection reference, the UE selects the corresponding cell.

Next, the UE may select the cell by using the stored information or using information broadcasted in the cell. Accordingly, the cell selection may be quickly performed as compared with the initial cell selection process. The UE selects the corresponding cell when just finding the cell satisfying the cell selection reference. If the UE does not find the suitable cell satisfying the cell selection reference through the process, the UE performs the initial cell selection process.

After the UE selects any cell through the cell selection process, the intensity or the quality of the signal between the UE and the BS may be changed according to mobility of the UE, a change in radio environment, or the like. Accordingly, when the quality of the selected cell deteriorates, the UE may select another cell providing better quality. As such, in the case of selecting the cell again, generally, the UE selects the cell providing better signal quality than the currently selected cell. This process is called cell reselection. The cell reselection process generally has a primary object to select a cell providing the best quality to the UE in terms of the quality of the radio signal.

In addition to the quality of the radio signal, the network determines a priority for each frequency to notify the determined priority to the UE. In the UE receiving the priority, the priority is first considered as compared the radio signal quality reference in the cell reselection process.

As such, there is the method of selecting or reselecting the cell according to a signal characteristic in the radio environment, and in the case of selecting the cell for reselection during the cell reselection, there may be methods of reselecting the cell according to a RAT of the cell and a frequency characteristic below.

Intra-frequency cell reselection: The UE reselects a cell having the same RAT and the same center-frequency as the cell during camping.

Inter-frequency cell reselection: The UE reselects a cell having the same RAT as and a different center-frequency from the cell during camping.

Inter-RAT cell reselection: The UE reselects a cell using a different RAT from the RAT during camping.

A principle of the cell reselection process is as follows.

First, the UE measures the quality of the serving cell and the quality of the neighbor cell for the cell reselection.

Second, the cell reselection is performed based on a cell reselection reference. The cell reselection reference has the following characteristics in association with the measurement of the serving cell and the neighbor cell.

The intra-frequency cell reselection is basically based on ranking. The ranking is an operation of defining index values for evaluating the cell reselection and ranking cells in an order of sizes of the index values by using the index values. A cell having the best index value is commonly called a best ranked cell. The cell index value is based on a value measured by the UE with respect to the corresponding cell and is a value applying a frequency offset or a cell offset if necessary.

The inter-frequency cell reselection is based on a frequency priority provided by the network. The UE attempts to camp on in a frequency having the highest frequency priority. The network may provide a frequency priority to be commonly applied to the UEs in the cell through broadcast signaling or provide a priority for each frequency for every UE through dedicated signal for each UE. The cell reselection priority provided through the broadcast signaling may be referred to as a common priority, and the cell reselection priority set by the network for each UE may be referred to as a dedicated priority. When the UE receives the dedicated priority, the UE may receive a validity time related with the dedicated priority together. When the UE receives the dedicated priority, the UE starts a validity timer set as the validity time received together. The UE applies the dedicated priority in the RRC idle mode while the validity timer operates. When the validity timer ends, the UE discards the dedicated priority and applies the common priority again.

For the inter-frequency cell reselection, the network may provide parameters (for example, a frequency-specific offset) used in the cell reselection to the UE for each frequency.

For the intra-frequency cell reselection or the inter-frequency cell reselection, the network may provide a neighbor cell list (NCL) used in the cell reselection to the UE. The NCL includes cell-specific parameters (for example, a cell-specific offset) used in the cell reselection.

For the intra-frequency cell reselection or the inter-frequency cell reselection, the network may provide a cell reselection black list used in the cell reselection to the UE. The UE does not perform the cell reselection with respect to the cell included in the black list.

Next, the ranking performed in the cell reselection evaluating process will be described.

A ranking criterion used to give the priority of the cell is defined by Equation 1.

$$R_S = Q_{meas,s} + Q_{hyst}, R_n = Q_{meas,n} - Q_{offset} \quad \text{[Equation 1]}$$

Here, $R_s$ represents a ranking criterion of the serving cell, $R_n$ represents a ranking criterion of the neighbor cell, $Q_{meas,s}$ represents a quality value measured with respect to the serving cell by the UE, $Q_{meas,n}$ represents a quality value measured with respect to the neighbor cell by the UE, $Q_{hyst}$ represents a hysteresis value for ranking, and $Q_{offset}$ represents an offset between the both cells.

In the intra-frequency, when the UE receives the offset $Q_{offsets,n}$ between the serving cell and the neighbor cell, $Q_{offset} = Q_{offsets,n}$, and when the UE does not receive $Q_{offsets,n}$, $Q_{offset} = 0$.

In the inter-frequency, when the UE receives the offset $Q_{offsets,n}$ for the corresponding cell, $Q_{offset} = Q_{offsets,n} + Q_{frequency}$, and when the UE does not receive $Q_{offsets,n}$, $Q_{offset} = Q_{frequency}$.

When the ranking criterion $R_s$ of the serving cell and the ranking criterion $R_n$ of the neighbor cell are changed in a similar state, the ranking order is frequently reversed as the changing result, and as a result, the UE may alternately reselect the two cells. $Q_{hyst}$ is a parameter for preventing the UE from alternately reselecting the two cells by giving the hysteresis in the cell reselection.

The UE measures the $R_s$ of the serving cell and the $R_n$ of the neighbor cell according to the Equation 1, regards the cell having the largest ranking criterion value as the best ranked cell, and selects the cell.

According to the reference, it can be seen that the quality of the cell acts as the most important reference in the cell reselection. When the reselected cell is not the suitable cell, the UE excludes the corresponding frequency or the corresponding cell from the cell reselection target.

Hereinafter, a radio link failure (RLF) will be described.

The UE continuously performs the measurement in order to maintain the quality of the radio link with the serving cell receiving the service. The UE determines whether the communication is impossible in the current situation due to deterioration of the quality of the radio link. When the communication is almost impossible due to the low quality of the serving cell, the UE determines the current situation as a radio link failure.

When the radio link failure is determined, the UE gives up the communication maintenance with the current serving cell, selects a new cell through the cell selection (or cell reselection) procedure, and attempts the RRC connection re-establishment to the new cell.

In a specification of 3GPP LTE, cases where the normal communication is impossible are exemplified below:

a case where the UE determines that there is a serious problem in the downlink communication link quality based on the radio quality measuring result of the PHY layer (determines that the quality of the PCell is low during the RLM.

a case where the UE determines that there is a problem in the uplink transmission when a random access procedure is continuously failed in a MAC sub-layer.

a case where the UE determines that there is a problem in the uplink transmission when uplink data transmission is continuously failed in an RLC sub-layer.

a case where the UE determines that the handover is failed.

a case where a massage received by the UE does not pass through an integrity check.

Hereinafter, the RRC connection re-establishment procedure will be described in more detail.

Figure 7:
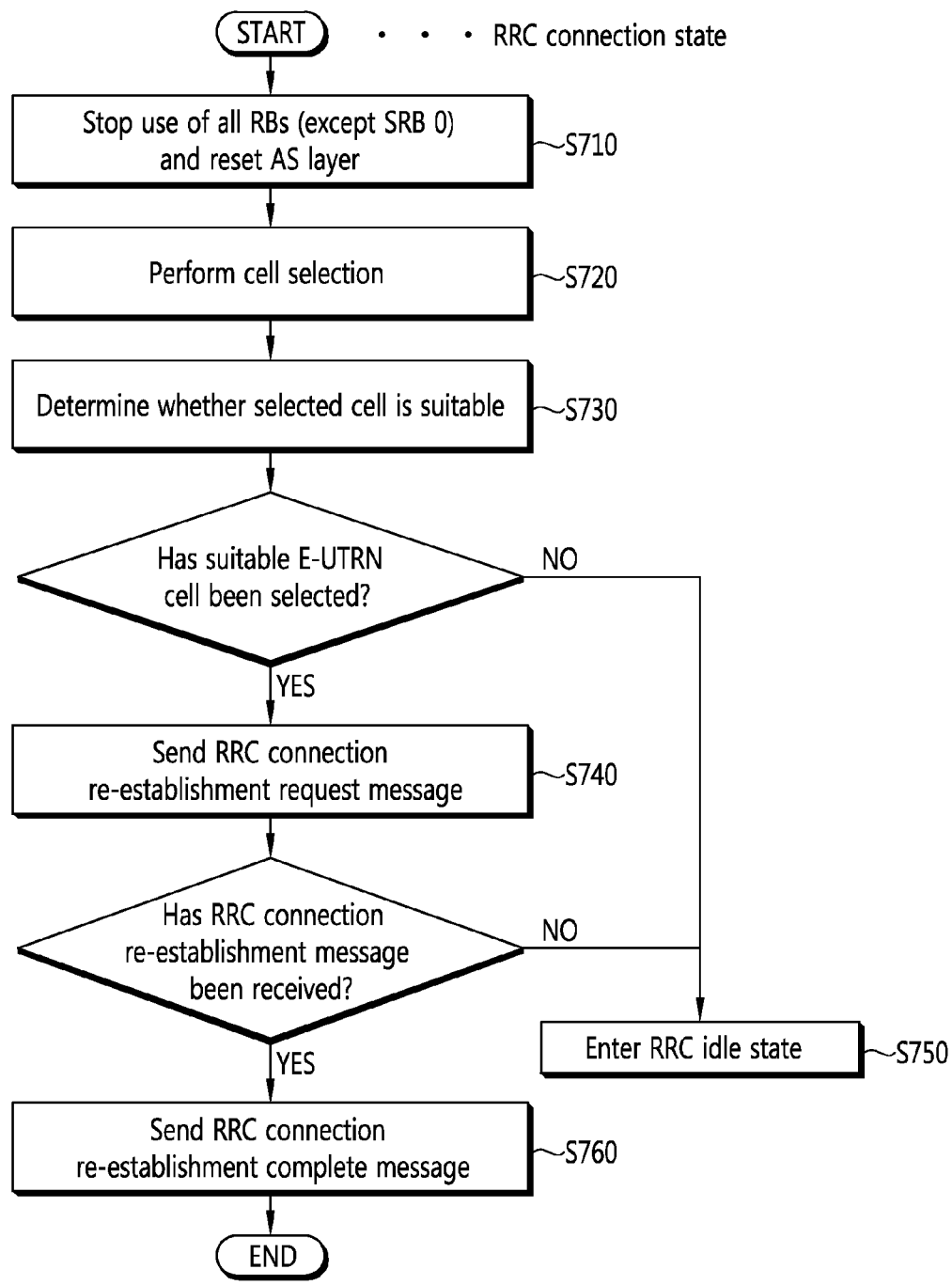
FIG. 7 is a diagram illustrating a RRC connection re-establishment procedure.

FIG. 7 is a diagram illustrating a RRC connection re-establishment procedure.

Referring to FIG. 7, the UE stops the used of all radio bearers which have been set except for signaling radio bearer #0 (SRB 0) and initializes each sub-layer of the AS (S710). Further, each sub-layer and the PHY layer are set as a default configuration. The UE maintains the RRC connection state during such a process.

The UE performs a cell selection procedure for performing the RRC connection reconfiguration procedure (S720). The cell selection procedure in the RRC connection reconfiguration procedure may be performed the same as the cell selection procedure performed in the RRC idle state of the UE even though the UE maintains the RRC connection state.

The UE verifies the system information of the corresponding cell to determine whether the corresponding cell is a suitable cell or not, after performing the cell selection procedure (S730). When it is determined that the selected cell is the suitable E-UTRAN cell, the UE transmits an RRC connection reestablishment request message to the corresponding cell (S740).

Meanwhile, when it is determined that the cell selected through the cell selection procedure for performing the RRC connection reestablishment procedure is the cell using the RAT other than the E-UTRAN, the UE stops the RRC connection reestablishment procedure and enters the RRC idle state (S750).

The UE may be implemented so that the cell selection procedure and the suitability verification of the cell by receiving the system information of the selected cell are finished within a limited time. To this end, the UE may drive a timer according to the starting of the RRC connection reestablishment procedure. The timer may stop when it is determined that the UE selects the suitable cell. When the timer ends, the UE may regard that the RRC connection reestablishment procedure is failed and enter the RRC idle state. The timer is hereinafter referred to as a radio link failure timer. In LTE specification TS 36.331, a timer called T311 may be used as the radio link failure timer. The UE may acquire the setting value of the timer from the system information of the serving cell.

In the case of receiving and accepting the RRC connection reestablishment request message from the UE, the cell transmits a RRC connection reestablishment message to the UE.

The UE receiving the RRC connection reestablishment message from the cell reconfigures the PDCP sub-layer and the RLC sub-layer for the SRB1. Further, the UE calculates various key values related with security setting and reconfigures the PDCP sub-layer responsible for the security with newly calculated security key values. As a result, the SRB 1 between the UE and the cell is opened, and the RRC control message may be transmitted and received. The UE completes the restarting of the SRB1, and transmits to the cell an RRC connection reestablishment complete message that the RRC connection reestablishment procedure is completed (S760).

On the contrary, in the case of receiving and rejecting the RRC connection reestablishment request message from the UE, the cell transmits a RRC connection reestablishment reject message to the UE.

When the RRC connection reestablishment procedure is successfully performed, the cell and the UE perform the RRC connection reestablishment procedure. As a result, the UE restores a state before performing the RRC connection reestablishment procedure and maximally secures continuity of the service.

Hereinafter, access restriction and control will be described.

In a current wireless communication system, two mechanisms that a provider to perform cell reservation or access restriction are provided. A first mechanism is a technique using indication of a cell status and special reservation for controlling cell selection and reselection procedures. A second mechanism as a technique referred to as access control is a technique that prevents a user of a selected class to transmit an initial access message due to a load control. In the following description, it is assumed that one or more access classes are allocated to the terminal and are stored a universal subscriber identity module (USIM).

Hereinafter, an access restriction mechanism associated with information regarding the cell status and the cell reservation will be described.

The information regarding the cell status and the cell reservation is included in system information block type 1 (SIB1).

The information regarding the cell status is configured to indicate whether to barring accessing the cell. That is, the cell status information may indicate that the accessing of the cell is barred or not barred. When a plurality of PLMNs is indicated in the SIB1, the cell status information may be commonly applied to all PLMNs.

The information regarding the cell reservation is configured to indicate whether the cell is a cell reserved for use by a specific provider. That is, the cell reservation information may be configured to indicate that the cell is reserved or not reserved. When the plurality of PLMNs is indicated in the SIB1, the cell reservation information may be specified for each PLMN.

When the cell status information indicates 'not barred' and the cell reservation information indicates 'not reserved', all terminals may consider a corresponding cell as a candidate cell during the cell selection and cell reselection procedures.

When the cell status information indicates 'not barred' and the cell reservation information indicates 'reserved', in the case where terminals that operate in the HPLMN/EHPLMN and correspond to access classes 11 to 15 are reserved with respect to the corresponding PLMN, the terminals may consider the corresponding cell as the candidate cell during the cell selection and cell reselection procedures. On the contrary, in the case where terminals that correspond to access classes 0 to 8 and 12 to 14 are reserved with respect to an rPLMN or selected PLMN, the terminals regard that the status of the corresponding cell is the 'barred' status and perform the operation.

When the cell status information indicates 'barred' or it is regarded that the corresponding cell is in the 'barred' status, the terminal may not select/reselect the corresponding cell and this is similarly applied even to an emergency call. The terminal may operate as follows in selecting other cell.

When the corresponding cell is a CSG cell, the terminal may select other cell at the same frequency when the cell selection/reselection condition is satisfied.

When the corresponding cell is not the CSG cell, the terminal may perform the cell selection/reselection procedure according to the intra-frequency cell reselection information. The intra-frequency cell reselection information may indicate whether the terminal may perform intra-frequency cell reselection when accessing a best ranked cell at a current frequency is barred. When the intra-frequency cell reselection information indicates that the intra-frequency cell reselection is allowed, the terminal may select other cell at the same frequency when the cell reselection condition is satisfied. Meanwhile, the terminal excludes the barred cell from the candidate cell for a specific time (e.g., 300 seconds) during the cell selection/reselection procedure. When the intra-frequency cell reselection information indicates that the intra-frequency cell reselection is not allowed, the terminal may regard that the cell at the same frequency is barred and perform an operation of selecting a cell at an inter-frequency. The terminal excludes the barred cell and the cell at the same frequency from the candidate cell for a specific time (e.g., 300 seconds) during the cell selection/reselection procedure.

Hereinafter, an access control technique based on the access class will be described.

Information on the cell access restriction associated with the access class is included in the system information to be broadcasted. The terminal disregards the access class associated with the cell access restriction in selecting a cell on which the terminals is to camp. That is, since any access class of the terminal is not allowed to access the corresponding terminal, the terminal does not exclude the corresponding cell even with respect to the camp-on A change of the indicated access restriction does not trigger the cell reselection by the terminal. The access class associated with the cell access restriction may be checked by the terminal in starting an RRC connection establishment procedure.

The restriction of the emergency call may be indicated by emergency call access class information as necessary. The emergency call access class information may be implemented as an ac-BarringForEmergency parameter of system information block 2 (SIB2) included in the system information. When it is indicated that access class 10 is barred in the cell, terminals that correspond to classes 0 to 9 or a terminal without an international mobile subscriber identity (IMSI) is not allowed to start the emergency call in the corresponding cell. When it is indicated that access class 10 and associated access classes 11 to 15 are barred, terminals that correspond to access classes 11 to 15 are not allowed to start the emergency call in the corresponding cell. Otherwise, the corresponding terminal may be allowed to start the emergency call.

A terminal in which extended access barring is available performs EAB checking to check whether accessing the current cell is barred in performing the RRC connection establishment. When accessing the cell is barred according to the result of the EAB checking, the EAB is applied to the NAS which is the higher layer and it is notified that the RRC connection establishment is unsuccessful.

In the case of performing the RRC connection establishment for calling mobile termination (MT), the terminal notifies to the NAS as the higher layer that the RRC connection establishment is unsuccessful and access restriction to the MT calling is applied when a T302 timer as a timer depending on rejection of the RRC connection is driven.

In the case of performing the RRC connection establishment for calling mobile originating (MO), the terminal may check whether accessing the current cell is barred based on an access class parameter provided based on the allocated access class and the system information. When the terminal determines that the access to the current cell is barred, the terminal may check whether the access to the current cell is barred by additionally considering a circuit switched fallback (CSFB) associated the access class parameter and notify the checked information to the NAS layer as the higher layer.

Hereinafter, an operation of the terminal and the network associated with RRC connection rejection will be described. In the RRC connection establishment procedure, when the network transmits an RRC connection denial message to the terminal in response to an RRC connection request message, the network does not allow the terminal to access the corresponding cell and/or the RAT of the corresponding cell according to a current network situation. To this end, the network may encapsulate in the RRC connection rejection message information associated with a cell reselection priority and/or access limit information for limiting cell access so as to stop the terminal from accessing the network.

The network may encapsulate in the RRC rejected connection message lowest priority request information indicating that a lowest priority is to be applied when the terminal performs the cell reselection. The lowest priority request information may include lowest priority type information indicating a type to which the lowest priority is applied and lowest priority timer information which is application duration of the lowest priority. The lowest priority type information may be configured to instruct the lowest priority to be applied to a frequency of a cell that transmits the RRC connection rejection message or the lowest priority to be applied to all frequencies of the RAT of the corresponding cell.

When the terminal receives the RRC connection rejection message including the lowest priority request information, the terminal starts a timer set as the lowest priority application duration and applies the lowest priority to a target indicated by the lowest priority type information to perform the cell reselection.

Next, a multimedia broadcast and multicast service (MBMS) will be described in detail.

An MCCH channel or an MTCH channel which are logic channels may be mapped to an MCH channel which is a transmission channel for the MBMS. The MCCH channel transmits an MBMS related RRC message and the MTCH channel transmits traffics of a specific MBMS service. One MCCH channel may be present for one MBMS single frequency network (MBSFN) that transmits the same MBMS information/traffic and when a plurality of MBSFN areas is provided in one cell, the terminal may receive a plurality of MCCH channels. When the MBMS related RRC message is changed in a specific MCCH channel, a PDCCH channel transmits an MBMS radio network temporary identity (M-RNTI) and an indication that indicates the specific MCCH channel. The terminal that supports the MBMS receives the M-RNTI and the MCCH indication through the PDCCH channel to determine that the MBMS related RRC message is changed in the specific MCCH channel and receive the specific MCCH channel. The RRC message of the MCCH channel may be changed every change cycle and is repeatedly broadcasted every repeated cycle.

The terminal may receive a dedicated service while receiving the MBMS. For example, a predetermined user may perform chatting by using an instant messaging (IM)

service such as MSM or Skype by using a smart phone while watching a TV by using the MBMS, through the smart phone possessed thereby. In this case, the MBMS may be provided through an MTCH together received by various terminals and services individually provided to respective terminals like the IM service may be provided through a dedicated bearer such as a DCCH or a DTCH.

In one area, a predetermined base station may simultaneously use various frequencies. In this case the network selects one of various frequencies to provide the MBMS only in the frequency and provide the dedicated bearer to each terminal in all frequencies, in order to efficiently use radio resources.

In this case, when the terminal that receives the service by using the dedicated bearer in a frequency in which the MBMS is not provided intends to receive the MBMS, the terminal needs to be handed over to a frequency in which the MBMS is provided. To this end, the terminal transmits an MBMS interest indication to the base station. That is, when the terminal intends to receive the MBMS, the terminal transmits the MBMS interest indication and when the base station receives the indication, the base station recognizes that the terminal intends to receive the MBMS, the base station moves to the frequency in which the MBMS is provided. Herein, the MBMS interest indication means information that the terminal intends to receive the MBMS and additionally includes information regarding which frequency the terminal intending to move to.

Further, the terminal may select the cell at the frequency at which the MBMS is provided as a target cell through the inter-frequency cell reselection at the frequency at which the MBMS is provided. Therefore, when the terminal accesses the corresponding cell and the cell provides the MBMS, the terminal may receive the MBMS. So as for the terminal to select the cell at the frequency at which the MBMS may be provided as possible, a highest priority may be applied to the corresponding frequency. The cell reselection method associated therewith will be described in detail with reference to FIG. 8.

Figure 8:
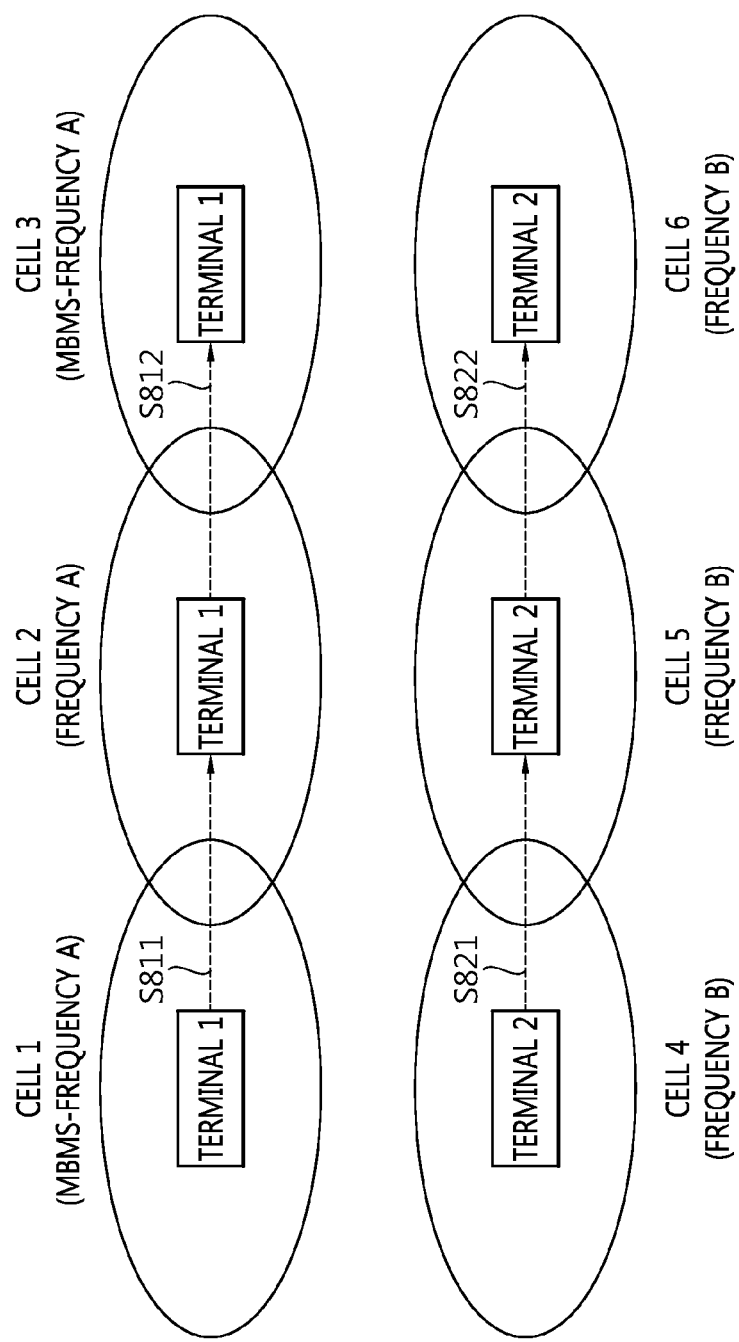
FIG. 8 is a diagram illustrating one example of performing cell reselection of a terminal associated with MBMS.

FIG. 8 is a diagram illustrating one example of performing cell reselection of a terminal associated with MBMS.

A terminal which receives the MBMS or intends to receive the MBMS on a predetermined frequency performs cell reselection by applying high priority to the corresponding frequency. The terminal performs the cell reselection by using frequency priority information reconfigured as the high priority instead of the frequency priority signaled by the network to receive the MBMS by moving the MBMS to the providing cell.

Referring to FIG. 8, it is assumed that terminal 1 is a terminal which receives the MBMS or intends to receive the MBMS, and terminal 2 is a terminal which does not receive the MBMS. Further, it is assumed that cells 1, 2, and 3 are operating in frequency A, and cells 4, 5, and 6 are operating in frequency B. Here, it is assumed that the cells 1, 2, 3, 4, 5, and 6 have the same coverage. Further, it is assumed that the priority of the frequency A signaled by the network is '3' and the priority of the frequency B is '5'.

The terminal 1 accesses to the cell 1 and receives the MBMS from the cell 1. When the terminal 1 deviated from the coverage of the cell 1, a new target cell is determined through cell reselection. Since the terminal 1 is the terminal receiving the MBMS, the cell reselection is performed by applying the high priority to the frequency A which is a frequency to which the MBMS is provided. Accordingly, the terminal 1 determines the cell 2 as a target cell and may access to the cell 2 (S811). When the terminal 1 deviates from the coverage of the cell 2, the ell reselection is performed by applying the high priority to the frequency A. Accordingly, the terminal 1 determines the cell 3 as a target cell and may access to the cell 3 (S812).

Terminal 2 accesses to cell 4 and receives the service from cell 4. When the terminal 2 deviated from the coverage of cell 2, a new target cell is determined through cell reselection. Since the terminal 2 is a terminal which is not associated with the MBMS, the cell reselection is performed by applying the priority to the frequency signaled from the network. Accordingly, the terminal determines the cell 5 operating in the frequency B having priority of 5 as the target cell instead of the cell 2 operating in the frequency A having priority of 3 and may access to the cell 5 (S821). Subsequently, when the terminal deviates from the coverage of the cell 5, the terminal the cell 6 determines the cell 6 as the target cell based on the signaled priority and may access to the cell 6 (S822).

As described above, since the terminal 1 receiving the MBMS performs the cell reselection by applying the high priority to a predetermined frequency to which the MBMS is provided, the terminal 1 may access to the cell providing the MBMS if possible.

According to the aforementioned access restriction mechanism, when the terminal senses that the current cell is barred or considered as a barred cell, the terminal may select/reselect the current cell or not access the current cell. Meanwhile, intra-frequency cell reselection information is included in system information provided from the current cell, and when the intra-frequency cell reselection information indicates that the cell reselection to the current frequency is not allowed, the terminal may select a cell on a different frequency rather than a serving frequency.

In the above environment, the terminal is interested in a predetermined service, and the corresponding service may be provided to a predetermined cell on the serving frequency. In this case, since the terminal may not select a different cell on the current frequency, the terminal may not select a cell which provides the predetermined service or can provide the predetermined service, and finally, does not receive an interested service. This situation may occur in associated with the MBMS service reception of the terminal, and there is a problem in that the terminal which is interested in the MBMS service does not receive the corresponding service.

As such, in order to prevent the problem that the terminal does not receive the interested service due to the barring of the cell access, it is required to provide a method of performing cell selection/cell reselection by considering the interested service of the terminal.

Figure 9:
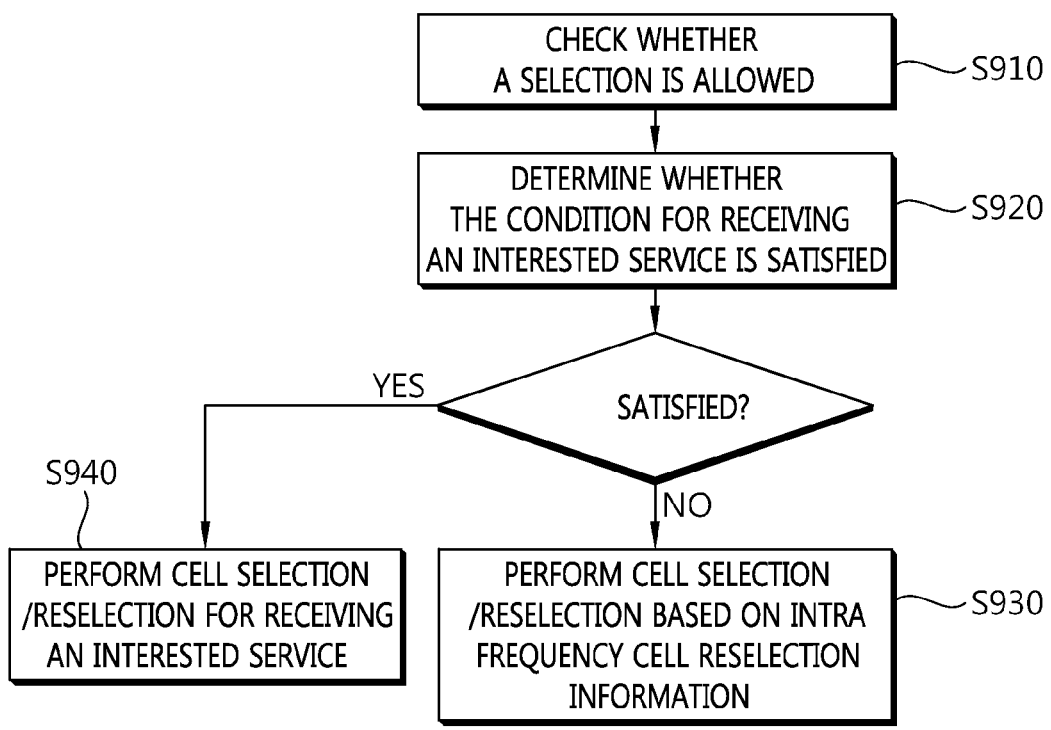
FIG. 9 is a diagram illustrating a terminal interested service-based cell selection/reselection method according to an exemplary embodiment of the present invention.

FIG. 9 is a diagram illustrating a terminal interested service-based cell selection/reselection method according to an exemplary embodiment of the present invention.

Referring to FIG. 9, the terminal checks whether the cell selection may be allowed (S910). The determining whether the cell selection is allowed may be checking whether the cell is barred or not based on cell status information and/or cell reservation information provided from the system information. The determining whether the cell selection is allowed may be checking whether the cell is considered as a barred status or not based on access control information associated with an access class.

When the cell is in a barred status or considered as the barred status, the terminal determines whether a reception condition of the interested service is satisfied (S920). The reception condition of the interested service may be implemented below.

1) In the case where the interested service of the terminal is provided from the current cell.

When the terminal senses that the interested service is provided from a current predetermined cell, the terminal may determines that the reception condition of the interested service is satisfied. For example, when the MBMS service is broadcasted from the current cell, the terminal may determines that the reception condition of the interested service is satisfied.

2) In the case where the interested service of the terminal is provided from a current cell and lowest priority is not applied to the current frequency.

Due to complexity of the network and the like, when the RRC connection is rejected, the terminal may configures that lowest priority is applied to the current frequency. Even in this case, when the terminal selects a different cell on the current frequency, even in the environment where serious complexity occurs in the current frequency, the terminal may be camped-on to the current frequency, a problem that network operating optimization deteriorates may occur. Accordingly, while the interested service is provided in the current frequency, when the lowest priority is not applied to the current frequency, determining that the reception condition of the interested service is satisfied may be preferred from the viewpoint of avoiding deterioration of the network operating optimization while maximally ensuring the provision of the interested service.

3) In the case where the interested service of the terminal is provided from the current cell and the terminal puts receiving the interested service before a general unicast service.

A user prefers receiving the interested service such as the MBMS to the service provided through the unicast, and in this case, the user may apply higher priority to the frequency in which the interested service is provided. For example, the terminal interested in the MBMS service may further enhance the priority for the corresponding frequency by transmitting a MBMS interest indicator to the network. As such, the terminal checks that the interested service is provided on the current frequency, and may determine that the reception condition of the interested service is satisfied when higher priority than the different frequency is applied to the corresponding frequency.

When the reception condition of the interested service is not satisfied, the terminal may perform cell selection/reselection based on the intra-frequency cell reselection information which is included and provided in the system information (S930). When the intra-frequency cell reselection information indicates that the cell selection on the same frequency as the current frequency is not allowed, the terminal may exclude the current cell of which the access is barred and the cell operating on the same frequency as the current frequency from candidate cells for cell selection/reselection. Accordingly, the terminal may perform the intra-frequency cell reselection based on the frequency priority.

On the other hand, when the intra-frequency cell reselection information indicates that the cell selection on the same frequency as the current frequency is allowed, the terminal excludes the current cell of which the access is barred from candidate cells for cell selection/reselection, but the different cell operating on the same frequency as the current frequency may be considered as the candidate cells for cell selection/reselection. Accordingly, the terminal may perform a ranking-based intra-frequency cell reselection.

On the other hand, when the reception condition of the interested service is satisfied, the terminal may select the cell operating on the same frequency as the current frequency regardless of the intra-frequency cell reselection information (S940). Accordingly, the terminal may perform the intra-frequency cell reselection based on the ranking.

When the cell operating on the same frequency as the serving frequency is selected, the terminal may exclude the barred current cell from the cell selection candidate. In this case, the terminal may select one of cells other than the current cell of the cells operating on the same frequency as the current frequency as a target cell.

When the terminal selects the cell operating on the same frequency as the current frequency, the current cell as well as the different cells may also be considered as the cell selection candidates. In this case, the terminal may consider that the barring for the current cell is released. The terminal may select one of the current cell and the different cells as the target cell.

As described above, when the terminal considers that the barring for the current cell is released, the considering may be performed based on whether the lowest priority is applied to the current frequency of the current cell. When the lowest priority is applied to the serving frequency, the terminal may consider that the barring for the current cell is not released and exclude the current cell from the candidates for cell selection/reselection. On the other hand, when the lowest priority is not applied to the current frequency, the terminal may consider that the barring for the current cell is released and may not exclude the current cell from the candidates for cell selection/reselection. For example, when the fact the lowest priority is not applied to the current frequency is included in the reception condition of the interested service, the terminal which determines that the intra-frequency cell selection is allowed may consider that the barring for the current cell is released.

Additionally, when the reception condition of the interested service is satisfied, considering that the barring for the barred cell is released by the terminal may be implemented so as to perform the operation of releasing the barring only while the RRC connection is not established in a RRC idle status. In this case, when the terminal intends to establish the RRC connection when the terminal is camped in the cell releasing the barring by satisfying the reception condition of the interested service, the terminal considers the corresponding cell considered that the barring is released before starting the RRC connection as the barred cell again, selects a different cell except for the corresponding cell, and may perform establishment of RRC connection with the selected cell.

Meanwhile, as such, the terminal determines whether the reception condition of the interested service is satisfied to perform cell selection/reselection according to indication of the network. The network may provide information indicating whether the interested cell-based cell selection/reselection is allowed to the terminal. The indication information may be broadcast-signaled from the network. Whether the cell selection/reselection is allowed based on the reception condition of the interested service of the terminal may be configured to be allowed when the corresponding indication information is provided to the terminal.

Referring to FIG. 9, as a situation where the aforementioned exemplary embodiment of the present invention may be applied, the terminal may consider a case of hoping for providing the MBMS service. That is, when the terminal hopes for receiving the MBMS service, the terminal determines a reception condition of the MBMS service and as a result, may perform cell selection/reselection.

Figure 10:
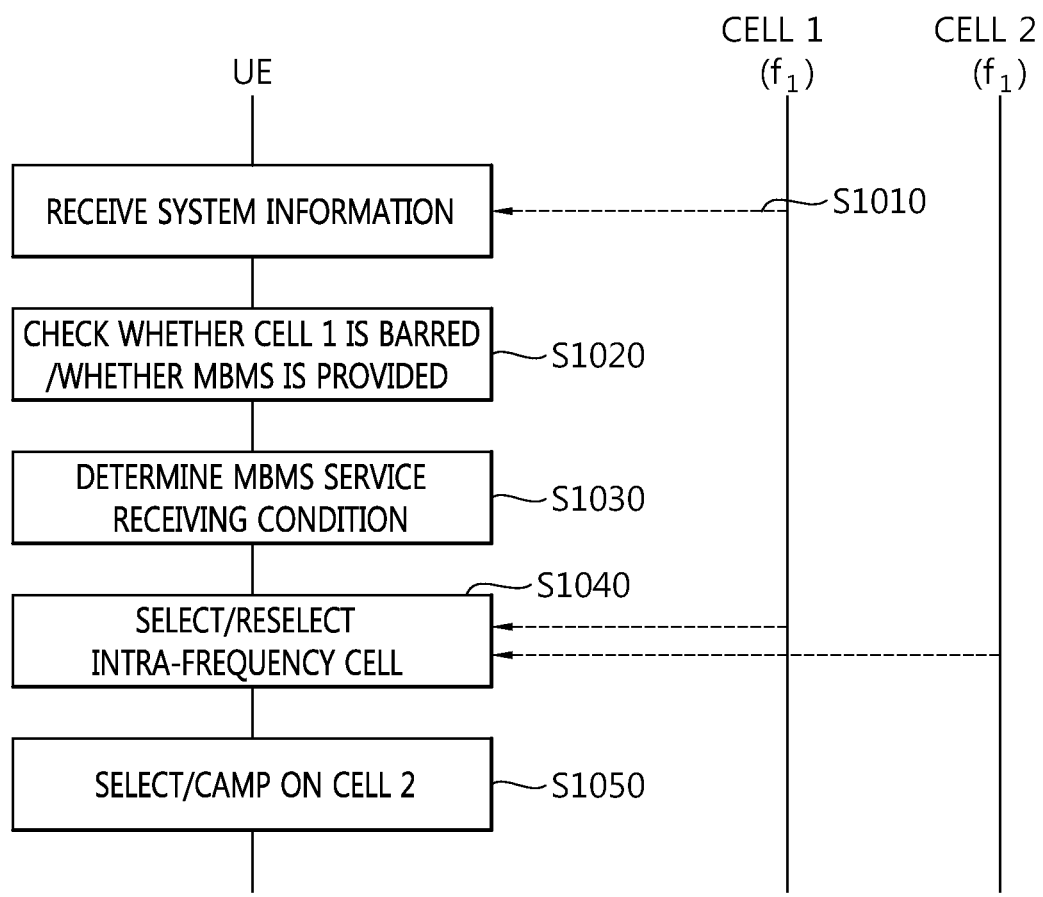
FIG. 10 is a diagram illustrating one example of an interested service-based cell selection/reselection method according to an exemplary embodiment of the present invention.

FIG. 10 is a diagram illustrating one example of an interested service-based cell selection/reselection method according to an exemplary embodiment of the present invention.

In an example of FIG. 10, it is assumed that the terminal is in a camp-on status in the cell 1 on a frequency $f_1$ and interested in reception of the MBMS service.

The terminal acquires system information transmitted from the cell 1 (S1010). In the system information, information which may be used to determine whether the terminal bars the access to the cell 1 may be included. For example, in the system information, cell status information, cell reservation information, and/or access class related information may be included. Further, in the system information, information informing whether the MBMS is provided onto the frequency $f_1$ from the cell 1 may be included.

The terminal may check whether the access to the cell 1 is barred based on the system information (S1020). When the cell status information indicates a state where the cell 1 is in a 'barred' status, the terminal may determine the cell 1 as the barred cell. When the cell reservation information indicates the 'reserved' status, the terminal may determine whether the cell 1 is barred according to an access class allocated to the terminal. Further, the terminal may check whether the cell 1 is barred according to the access class related information and the access class allocated to the terminal. In the example, it is assumed that the terminal determines the cell 1 as the access-barred cell.

Further, the terminal may check whether the MBMS service is provided from the cell 1. The terminal may check whether the MBMS is provided on the frequency $f_1$ based on SIB 13 of the system information. In the example, it is assumed that it is checked that the MBMS service is provided on $f_1$.

The terminal determines whether the reception condition of the MBMS service is satisfied (S1030). The reception condition of the MBMS service may be performed according to the aforementioned reception condition of the interested service. In the example, since the cell 1 provides the MBMS service, the terminal may determine that the reception condition of the MBMS service is satisfied. Since the reception condition of the MBMS service is satisfied, the terminal may consider a cell operating in the same frequency as the current frequency as a cell selection/reselection candidate cell regardless of the intra-frequency cell reselection information included in the system information.

The terminal performs intra-frequency cell selection/reselection (S1040). The terminal may perform the cell selection/reselection by setting a cell operating in the same frequency as the serving frequency as a candidate cell. The terminal may include the barred current cell in the candidate cell for cell selection/reselection or exclude the barred current cell from the barred current cell. Whether the barred current cell is included may depend on determination of the terminal for whether the barring of the current cell is released as illustrated in FIG. 9. In the case of considering that the barring of the current cell is released, the terminal may include the current cell in the candidate cell, and if not, the terminal may exclude the current cell from the candidate cell.

According to the intra-frequency cell reselection, the terminal determines the target cell based on the ranking, and the terminal may be camped-on in the cell 2 operating in $f_1$ (S1050). Generally, since the network operates by setting a predetermined frequency as a frequency for proving the MBMS service among a plurality of frequencies, the MBMS service may be provided from the cell 2 operating on $f_1$. Accordingly, the terminal may receive the MBMS service which is the interested service from the cell 2.

According to an interested service-based cell reselection method of an exemplary embodiment of the present invention, even when a current cell is interrupted and it is indicated that intra-frequency cell reselection is not allowed by network signaling, a terminal can select or reselect which operates at a frequency which is the same as a current frequency. Therefore, a terminal can continuously receive an interested service provided at the current frequency.

Further, whether a network is congested with respect to a serving frequency can be reflected on an operation of the terminal that performs cell selection/reselection regardless of intra-frequency cell reselection information. That is, when the network is congested, the terminal may be implemented to perform cell selection/reselection according to the intra-frequency cell reselection information. Accordingly, when extreme congestion occurs at the current frequency, the intra-frequency cell selection/reselection can be avoided, and as a result, optimization of a network operation can be maintained.

Figure 11:
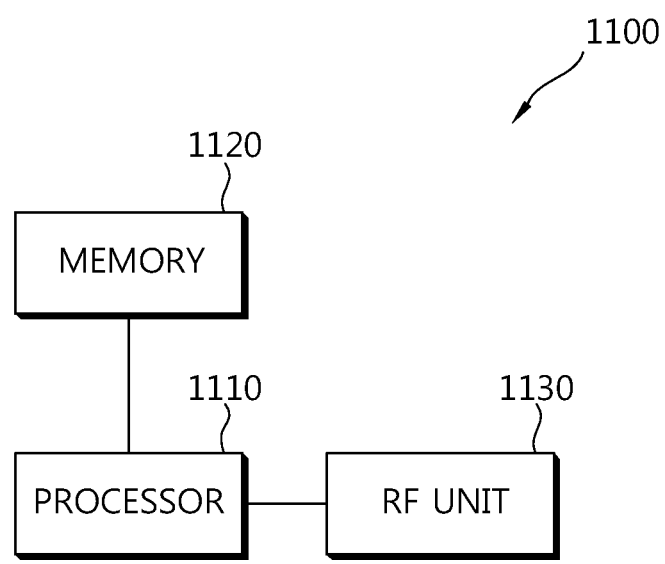
FIG. 11 is a block diagram illustrating a wireless device in which the exemplary embodiment of the present invention is implemented.

FIG. 11 is a block diagram illustrating a wireless device in which the exemplary embodiment of the present invention is implemented. This device may be implemented as a terminal and a base station that perform the terminal information based operation method for acquiring system information according to an exemplary embodiment of the present invention.

Referring to FIG. 11, the wireless device 1100 includes a processor 1110, a memory 1120, and a radio frequency (RF) unit 1130. The processor 1110 implements a function, a process, and/or a method which are proposed. The processor 1110 may be configured to sense whether a current cell is barred. The processor 1110 may be configured to sense whether an interested service is provided onto a current frequency from the current cell. The processor 1110 may be configured to determine whether an interested service receiving condition is satisfied. The processor 1110 may be configured to perform cell selection/reselection according to whether the interested service receiving condition being satisfied. The processor 1110 may be configured to implement the exemplary embodiment described with reference to FIGS. 9 to 10.

The RF unit 1130 is connected with the processor 1110 to transmit and receive a radio signal.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the exemplary embodiment is implemented by software, the aforementioned technique may be implemented by a module (a process, a function, and the like) performing the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. An interested service-based cell reselection method performed by a user equipment (UE) in a wireless communication system, the method comprising:
   receiving, from a current cell, system information including intra-frequency cell reselection information;
   determining whether an interested service receiving condition is satisfied when access to the current cell is barred;
   if the interested service receiving condition is not satisfied,
      selecting a first cell which operates at a frequency of the current cell when the intra-frequency cell reselection information indicates that intra-frequency cell reselection is performed; and
      selecting a second cell which operates at a frequency different from the frequency of the current cell when the intra-frequency cell reselection information indicates that the intra-frequency cell reselection is not performed; and
   if the interested service receiving condition is satisfied, selecting a third cell which operates at the frequency of the current cell regardless of the intra-frequency cell reselection information.

2. The method of claim 1,
   wherein it is determined that the interested service receiving condition is satisfied when the interested service of the UE is provided from the current cell.

3. The method of claim 1,
   wherein it is determined that the interested service receiving condition is satisfied when the interested service of the UE is provided from the current cell and application of a lowest priority to the frequency of the current cell is not configured.

4. The method of claim 1,
   wherein it is determined that the interested service receiving condition is satisfied when the interested service of the UE is provided from the current cell and a priority lower than a priority of another frequency is applied to the frequency of the current cell.

5. The method of claim 1, further comprising:
   receiving cell status information indicating whether the access to the current cell is barred,
   wherein the cell status information is included in the system information broadcast from the current cell.

6. The method of claim 1, wherein the determination of whether the access to the current cell is barred is performed based on access class barring information included in the system information.

7. The method of claim 1, wherein the frequency of the current cell is a serving frequency of the UE.

8. A wireless device that operates in a wireless communication system, the wireless device comprising:
   a radio frequency (RF) unit configured to transmit or receive a radio signal; and
   a processor which operates in a functional association with the RF unit, the processor configured to:
   receive, from a current cell via the RF unit, system information including intra-frequency cell reselection information;
   determine whether an interested service receiving condition is satisfied when access to the current cell is barred;
   if the interested service receiving condition is not satisfied,
      select a first cell which operates at a frequency of the current cell when the intra-frequency cell reselection information indicates that intra-frequency cell reselection is performed; and
      select a second cell which operates at a frequency different from the frequency of the current cell when the intra-frequency cell reselection information indicates that the intra-frequency cell reselection is not performed; and
   if the interested service receiving condition is satisfied, select a third cell which operates at the frequency of the current cell regardless of the intra-frequency cell reselection information.

9. The wireless device of claim 8,
   wherein it is determined that the interested service receiving condition is satisfied when the interested service of the UE is provided from the current cell.

10. The wireless device of claim 8,
    wherein it is determined that the interested service receiving condition is satisfied when the interested service of the UE is provided from the current cell and application of a lowest priority to the frequency of the current cell is not configured.

11. The wireless device of claim 8,
    wherein it is determined that the interested service receiving condition is satisfied when the interested service of the UE is provided from the current cell and a priority lower than a priority of another frequency is applied to the frequency of the current cell.

12. The wireless device of claim 8, wherein the processor is further configured to:
    receive cell status information indicating whether the access to the current cell is barred,
    wherein the cell status information is included in the system information broadcast from the current cell.

13. The wireless device of claim 8, wherein the determination of whether the access to the current cell is barred is performed based on access class barring information included in the system information broadcast from the current cell.

14. The wireless device of claim 8, wherein the frequency of the current cell is a serving frequency of the UE.

* * * * *